United States Patent
Kallarackal et al.

(10) Patent No.: US 11,345,538 B2
(45) Date of Patent: May 31, 2022

(54) AIR BLASTER

(71) Applicant: THEJO ENGINEERING LTD., Chennai (IN)

(72) Inventors: Manoj Joseph Kallarackal, Chennai (IN); Harikrishnan Reghunathan Nair, Chennai (IN); Manimaran Elumalai, Chennai (IN); Dinakar Moses, Chennai (IN)

(73) Assignee: THEJO ENGINEERING LTD., Chennai (IN)

( * ) Notice: Subject to any disclaimer, the term of this patent is extended or adjusted under 35 U.S.C. 154(b) by 0 days.

(21) Appl. No.: 16/645,124

(22) PCT Filed: Jun. 20, 2018

(86) PCT No.: PCT/IN2018/050404
§ 371 (c)(1),
(2) Date: Mar. 6, 2020

(87) PCT Pub. No.: WO2018/235099
PCT Pub. Date: Dec. 27, 2018

(65) Prior Publication Data
US 2021/0002071 A1 Jan. 7, 2021

(30) Foreign Application Priority Data
Jun. 20, 2017 (IN) .............................. 201741021571

(51) Int. Cl.
*B65G 53/50* (2006.01)
*B65D 88/70* (2006.01)
*B65G 69/08* (2006.01)

(52) U.S. Cl.
CPC .......... *B65D 88/703* (2013.01); *B65G 69/08* (2013.01); *B65G 2814/0229* (2013.01)

(58) Field of Classification Search
CPC ........ B65G 53/16; B65G 53/22; B65G 53/50; B65G 69/08; B65G 2814/0229; B65D 88/548; B65D 88/70; B65D 88/72; B65D 88/703; B65D 45/02; B65D 45/08;
(Continued)

(56) References Cited

U.S. PATENT DOCUMENTS

| | | | | |
|---|---|---|---|---|
| 1,799,914 A | * | 4/1931 | Renee | F17C 13/04 222/3 |
| 2,598,248 A | * | 5/1952 | Gagnan | F17C 13/04 222/3 |

(Continued)

*Primary Examiner* — Joseph A Dillon, Jr.
(74) *Attorney, Agent, or Firm* — Rumit Ranjit Kanakia (57) ABSTRACT

The present invention provides an air blaster 100 for removing jammed materials. The air blaster 100 includes a tank 110 filled with compressed air and a dual piston assembly 400 inside the tank 110 for triggering a blast with minimum energy loss and high impact force. The piston assembly 400 includes an inlet piston 320 connected to an outlet piston 250 with a coupling mechanism such that the inlet piston 320 and the outlet piston 250 move in tandem and pressure acting on the inlet piston 320 and outlet piston 250 pushes the assembly 400 towards top of the tank 110 thereby compressing a dampening device/spring 360. The force produced by the instant discharge of air creates a strong blast of air in the tank 110.

14 Claims, 12 Drawing Sheets

(58) Field of Classification Search
CPC .. B65D 83/0022; B65D 83/038; B65D 83/24; B65D 83/005
USPC ...... 406/46, 49, 73, 134, 137, 198; 222/2, 3, 222/637; 137/198, 456, 493.2, 493.8
See application file for complete search history.

(56) References Cited

U.S. PATENT DOCUMENTS

| | | | | |
|---|---|---|---|---|
| 3,029,981 A * | 4/1962 | Webster | ............... | F17C 1/00 222/3 |
| 3,258,160 A * | 6/1966 | Allen | ............... | F17C 13/04 222/4 |
| 3,285,469 A * | 11/1966 | Perisse | ............... | F16K 17/00 222/3 |
| 3,613,960 A * | 10/1971 | Beard | ............... | B65D 83/42 222/330 |
| 3,637,110 A * | 1/1972 | Cirillo | ............... | B60R 21/268 222/3 |
| 3,651,988 A * | 3/1972 | Cirillo | ............... | B60R 21/268 222/3 |
| 3,656,665 A * | 4/1972 | Fleming | ............... | B60R 21/268 222/500 |
| 3,915,339 A * | 10/1975 | Matson | ............... | B65D 88/703 222/3 |
| 4,099,688 A * | 7/1978 | Jayne | ............... | B64C 25/32 137/74 |
| 4,269,359 A * | 5/1981 | Neiss | ............... | B24C 5/02 239/530 |
| 4,469,247 A * | 9/1984 | Tompkins | ............... | B65D 88/703 137/199 |
| 4,496,076 A | 1/1985 | Topmkins | | |
| 4,496,607 A * | 1/1985 | Mathias | ............... | C04B 41/009 174/255 |
| 4,525,105 A * | 6/1985 | Jaggi | ............... | B65G 53/66 406/50 |
| 4,703,869 A * | 11/1987 | De Rooy | ............... | B65D 88/703 222/3 |
| 4,767,024 A * | 8/1988 | Rappen | ............... | B65D 88/703 222/195 |
| 4,852,949 A * | 8/1989 | Quinn | ............... | B60B 39/10 303/113.2 |
| 5,024,029 A * | 6/1991 | Abbott | ............... | B25F 5/02 451/101 |
| 5,143,256 A * | 9/1992 | Wadensten | ............... | B65D 88/703 222/195 |
| 5,964,420 A * | 10/1999 | Hampton | ............... | A01M 9/0046 239/654 |
| 6,237,893 B1* | 5/2001 | Rose | ............... | F16K 15/063 251/323 |
| 6,321,939 B1 | 11/2001 | Treat et al. | | |
| 6,702,248 B2* | 3/2004 | Treat | ............... | B65D 88/703 251/28 |
| 6,726,059 B2 | 4/2004 | Treat | | |
| 7,837,062 B2* | 11/2010 | Pronschinske | ............... | B65D 88/703 222/3 |
| 8,950,195 B2* | 2/2015 | Watts | ............... | F17C 7/04 62/50.2 |
| 10,288,224 B2* | 5/2019 | Schmidt | ............... | F17C 1/00 |
| 10,737,877 B2* | 8/2020 | Treat | ............... | B65D 88/703 |
| 10,882,690 B2* | 1/2021 | Steele | ............... | B65D 88/26 |
| 2002/0134791 A1* | 9/2002 | Treat | ............... | B65D 88/70 222/3 |
| 2010/0269919 A1* | 10/2010 | Stopka | ............... | F04B 41/02 137/376 |
| 2014/0238908 A1* | 8/2014 | Tokuda | ............... | B07B 4/02 209/643 |

* cited by examiner

AIR BLASTER

FIELD OF THE INVENTION

The present invention relates to air-accumulators and discharge devices. More particularly, the invention relates to air blasters with quick release discharge mechanism.

BACKGROUND

The passage of bulk materials through conventional handling equipment is often degraded or interrupted. Typical bulk materials comprise concrete mixtures, grains, wood chips or other granular materials disposed within large hoppers or storage bins. In conventional, conically shaped hoppers, for example, bridges or arches of bulk materials often form, preventing or minimizing the orderly flow or delivery of granular materials. Often, "rat holes" or funnels build up, and material passage is severely degraded or halted altogether. Particles of bulk material may form cohesive bonds either by adhesion due to chemical or electrostatic attraction, or particles may interlock because of horizontal and vertical compression. Such materials usually tend to cake or congeal during bulk processing. When moisture accumulates, unwanted caking tends to block flow. It is also recognized that friction between bulk material and the walls of a typical bunker or hopper in which the material is confined tends to interfere with proper flow.

Blast aerators or air cannons have long been employed to dislodge blocked or jammed bulk material. Storage bins or hoppers, for example, are often fitted with one or more high pressure air cannons that periodically blast air into the interior to dislodge caked particles, break funnels and bridges, and destroy rat holes. Bulk flow problems can temporarily be stopped by physically vibrating the hopper or container to shake loose the jammed materials. But not all materials may be dislodged in this manner. For example, large concrete bunkers may be impossible to vibrate. Materials like soft wood chips ordinarily absorb vibratory energy and must be dislodged by other methods.

Air blasters are preferred over vibrators because of efficiency. The forces generated by blast aerators are applied directly to the material to be dislodged, rather than to the walls of the structure. Modern air blasters are also preferred over air slides, air wands, and various air screen devices which operate at low pressures. Live bottoms in hoppers or bins are limited in their effectiveness, since they may tend to create bridging or arching of material. Modern air cannons or blast aerators are intended for use as a flow stimulator against materials that are primarily moved by gravity. They are not intended to be the prime movers of such materials, and for safety purposes they should not be used to initiate the flow or movement of bulk materials unless a gravity feed is employed.

Typical blast aerators comprise a large, rigid holding tank that relatively slowly accumulates air supplied through standard, high pressure air lines available at typical industrial facilities. A special valve assembly associated with the tank includes a high-volume discharge opening directed towards or within the target application. External, solenoid-activated valve assemblies are employed to periodically activate the air cannon, whereupon the large volume of air that was slowly accumulated in the holding tank is rapidly and forcibly discharged within a few milliseconds. The volume of compressed air released by a modern blast aerator strikes the bulk material at a rate over 1000 feet per second. Materials exposed to this high-volume inrush are forcibly dislodged by the impact. The large volume of air released by the aerator spreads throughout the bin or hopper, distributing forces throughout the interior that tend to homogenize and dislodge the mixture. After an exhaust blast, the actuator assembly signals the apparatus to return to a "fill" position, wherein the displaceable internal blast piston blocks the aerator blast output path. The cycle repeats as air that has relatively slowly accumulated again within the blaster is subsequently discharged during the next cycle.

Some of the existing Air blasters includes valves, when the valve actuates, compressed air stored inside the tank travels through the pipe before entering the discharge. The compressed air loses some of its pressure while travelling through the pipe, thus resulting in reduced impact force.

The known air blasters include a discharge pipe extends from the tank outlet through the inside of the tank, up till the inlet portion. A single cylinder housing is fastened to the discharge pipe and a piston is placed inside the housing. This mechanism is used to trigger the blast. During the blast stage, the compressed air inside the tank is made to travel through the discharge pipe located within the tank before reaching the blast site. This additional length travelled by the air increases the time taken for the air to blast into the silo and also reduces the air pressure due to the longer distance travelled by air before the actual blast happens. As a result, there is a drop in the impact force of the blast.

In view of the above, there exists a need of improved air blaster and method of discharge to enable impactful blasts for removal of Jammed materials.

SUMMARY OF THE INVENTION

According to an embodiment, the present invention provides an air blaster for removing jammed materials. The air blaster includes a tank filled with compressed air wherein an inlet pressure of the compressed air drops when the compressed air supply is cut off thereby resulting in a differential pressure inside the tank as a pressure inside the tank becomes higher than the inlet pressure, and a dual piston assembly inside the tank for triggering a blast with minimum energy loss and high impact force, wherein the piston assembly includes an inlet piston connected to an outlet piston with a coupling mechanism such that the inlet piston and the outlet piston move in tandem and pressure acting on the inlet and outlet piston pushes the assembly towards top of the tank thereby compressing a dampening device/spring; wherein movement of dual piston assembly opens a gap for instant discharge of compressed air through a contracting discharge mechanism and a force produced by the instant discharge of air creates a strong blast of air in the tank.

In an embodiment the invention includes a method for triggering high speed blast in air blaster. The method includes the step of filling a tank of the air blaster with compressed air wherein the compressed air passes through an inlet hole from a quick exhaust valve connected to it and then passes through the air holes provided on an inlet piston before it is filled into the tank. The method further includes the step of continuously pressing an outlet piston face of an outlet piston against a sealing lip thereby preventing the air inside the tank from leaking outside wherein the tank fills until incoming compressed air pressure is equal to the pressure within the tank. The method includes achieving an optimum level for operating the blaster once pressure of the inlet compressed air and the filled compressed air is equal, cutting off compressed air supply to reduce an inlet pressure of the compressed air thereby resulting in a differential pressure inside the tank as a pressure inside the tank becomes higher than the inlet pressure, and triggering a blast with minimum energy loss and high impact force through movement of a dual piston assembly wherein the piston assembly includes the inlet piston connected to the outlet piston with a coupling mechanism such that the inlet piston and the outlet piston move in tandem and pressure acting on the inlet piston and outlet piston pushes the assembly towards top of the tank thereby compressing a dampening device, wherein movement of dual piston assembly opens a gap for instant discharge of compressed air through a contracting discharge mechanism and a force produced by the instant discharge of air creates a strong blast of air from the tank.

The present invention is advantageous in providing a faster filling, faster discharge and greater blast force air blaster.

DESCRIPTION OF THE INVENTION

Various embodiment of the present invention provides an air blaster for removing jammed materials. The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "top," "bottom," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

Embodiments described herein will refer to plan views and/or cross-sectional views by way of ideal schematic views. Accordingly, the views may be modified depending on simplistic assembling or manufacturing technologies and/or tolerances. Therefore, example embodiments are not limited to those shown in the views but include modifications in configurations formed on basis of assembling process. Therefore, regions exemplified in the figures have schematic properties and shapes of regions shown in the figures exemplify specific shapes or regions of elements, and do not limit the various embodiments including the example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to air blaster.

Figure 1:
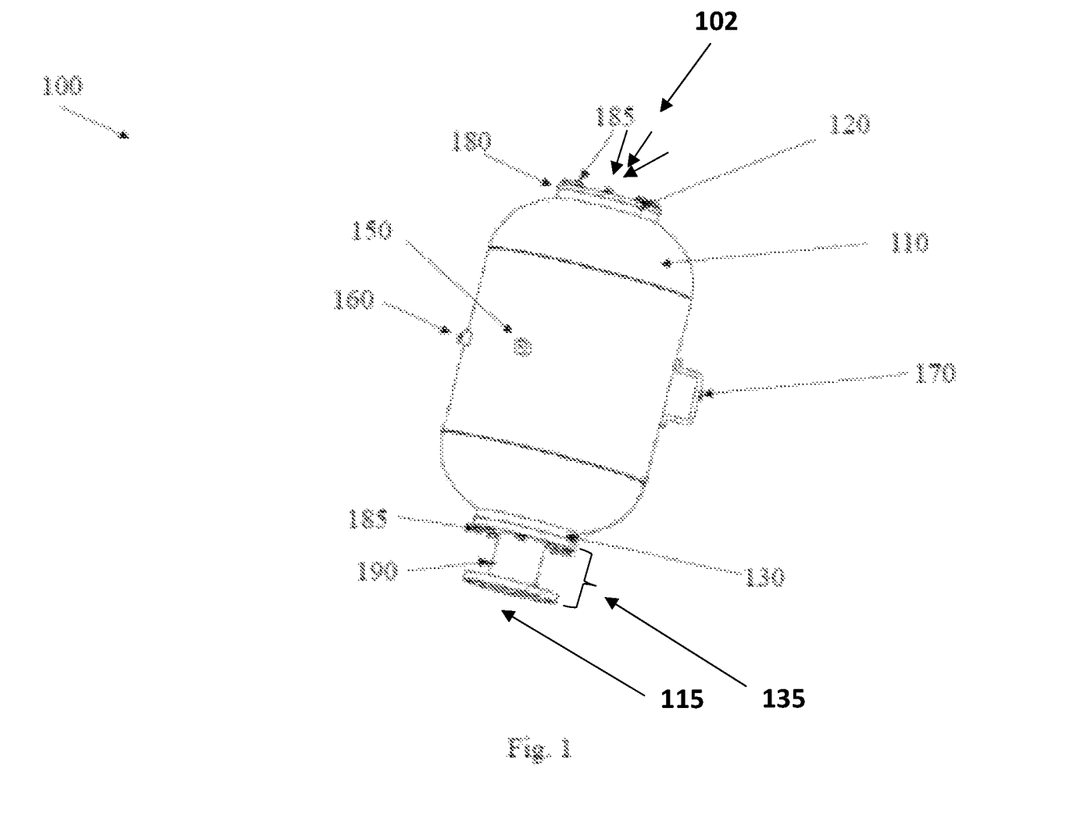
FIG. 1 shows a perspective view of an air blaster in accordance with an embodiment of the present invention.
Figure 1A:
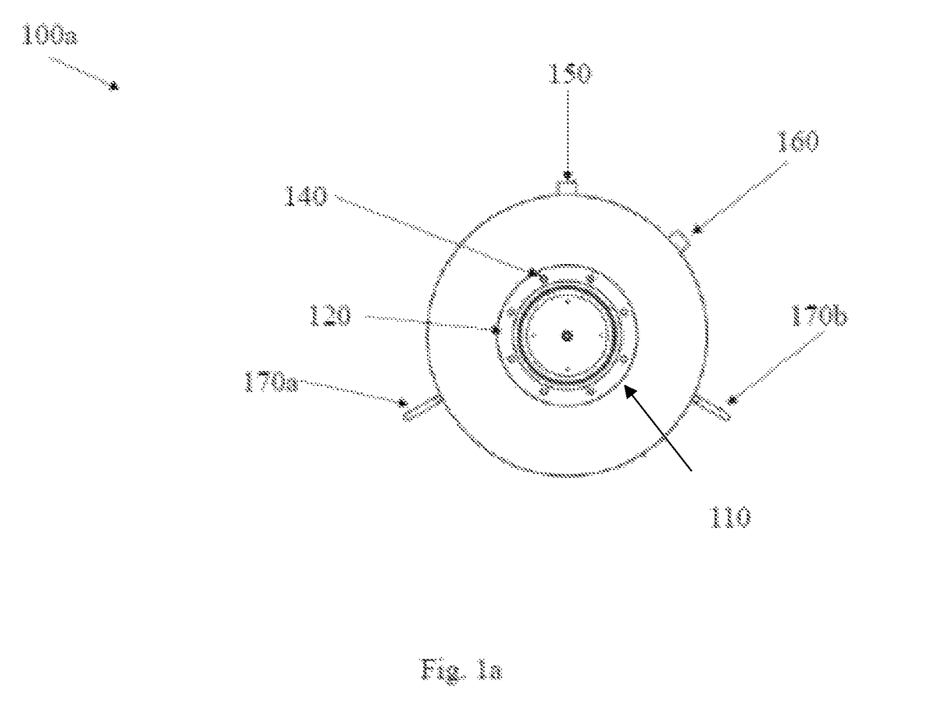
FIG. 1a shows an inlet side of the air blaster in accordance with an embodiment of the present invention.
Figure 1B:
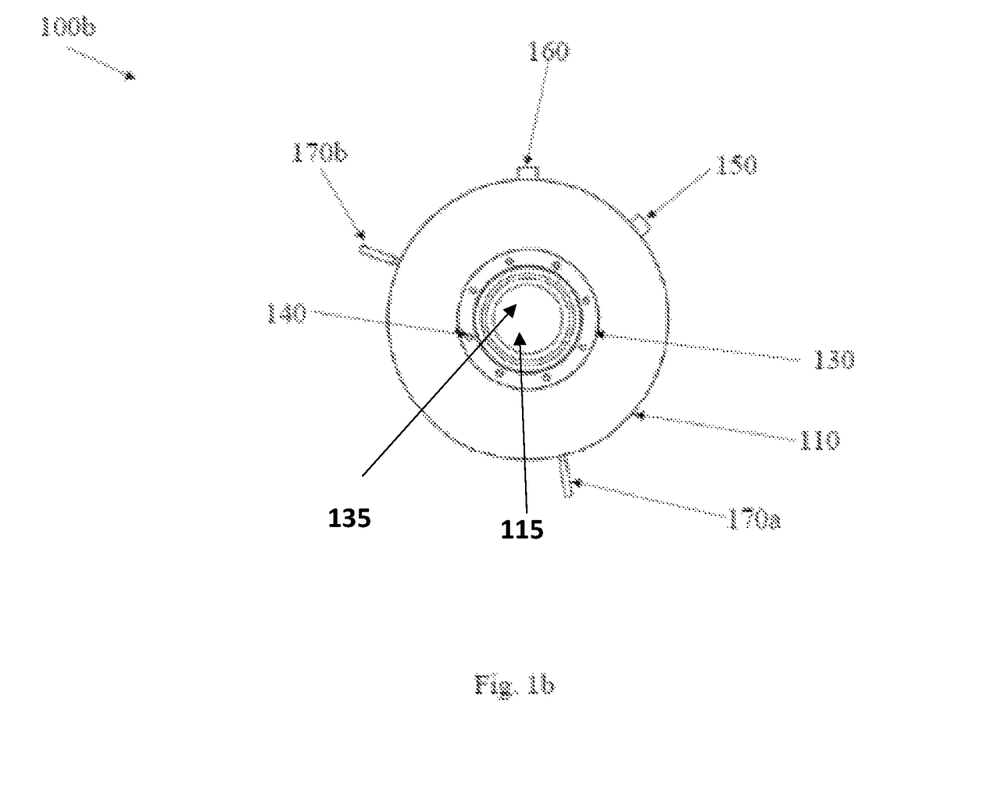
FIG. 1b shows an outlet/discharge side of the air blaster in accordance with an embodiment of the present invention.
Figure 1C:
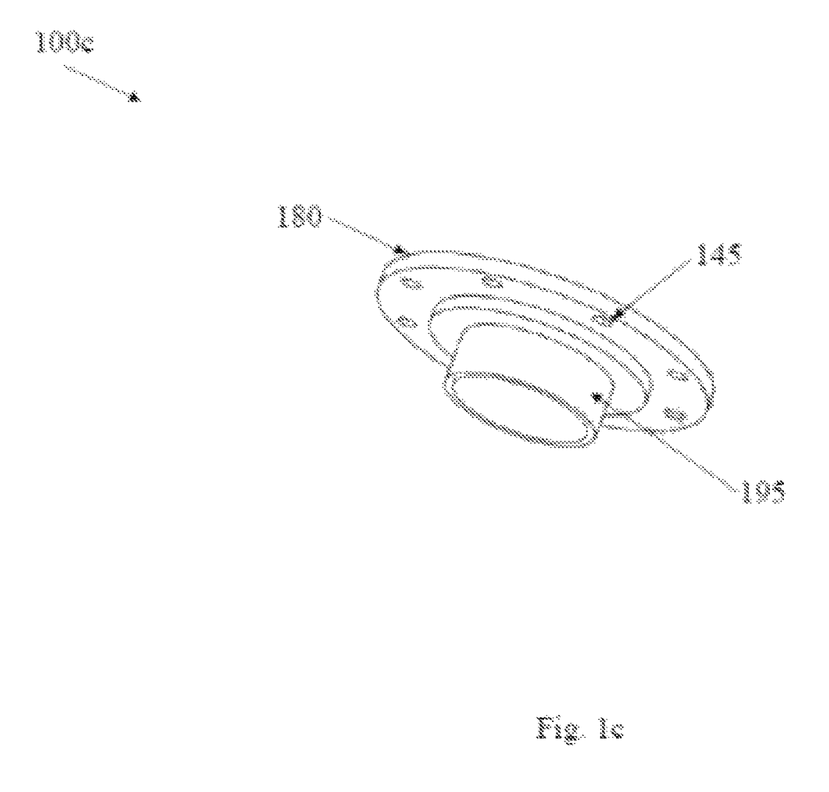
FIG. 1c shows a top cover of the air blaster in accordance with an embodiment of the present invention.

FIGS. 1, 1a, 1b and 1c, shows an air blaster (100) and various components of the air blaster (100) according to embodiment of present invention. The air blaster (100) comprises a tank (110) made from materials suitable to hold pressurized compressed air having pressure up to 10 Bar. The tank (110) can be of various sizes, shapes according the requirement and can be manufactured from metal or any other material capable of withstanding the pressure & temperature. The tank (110) has two flanges, one inlet flange (120) at inlet side and one outlet flange (130) at outlet side, fixed to each end and placed co-axially. The flanges (120, 130) have an opening in the centre and have multiple threaded holes (140) spaced equally along a suitable diameter, on the face of the flange as shown in FIG. 1a with inlet side view 100a of the air blaster 100 and in FIG. 1b with outlet side view 100b of the air baster 100. However, these holes may be provided in any other configuration, as desired. The tank 100 is provided with two sockets (150, 160) fixed to the body, which have openings into the interior of the tank 100. One of the sockets is fitted with a safety relief valve (150) while another socket will be fitted with a pressure gauge (160). In addition to these sockets a bigger socket and plug may be provided as a tank inspection socket. Two handles 170 (170a, 170b) are provided on the tank (110) body for ease of handling. Further, the air blaster 100 includes a top cover (180), a coupling (190) fastened to the tank (110) with suitable fasteners (185) inserted into the threaded holes provided on the outlet flange (130). Referring to FIG. 1c, a top cover perspective view (100c) of the air blaster (100) is shown with a guide (195) configured to hold a spring in correct position. The top cover (180) is provided with equidistant holes (145), in conformity with the threaded holes (140) on the inlet flange (120).

Figure 2:
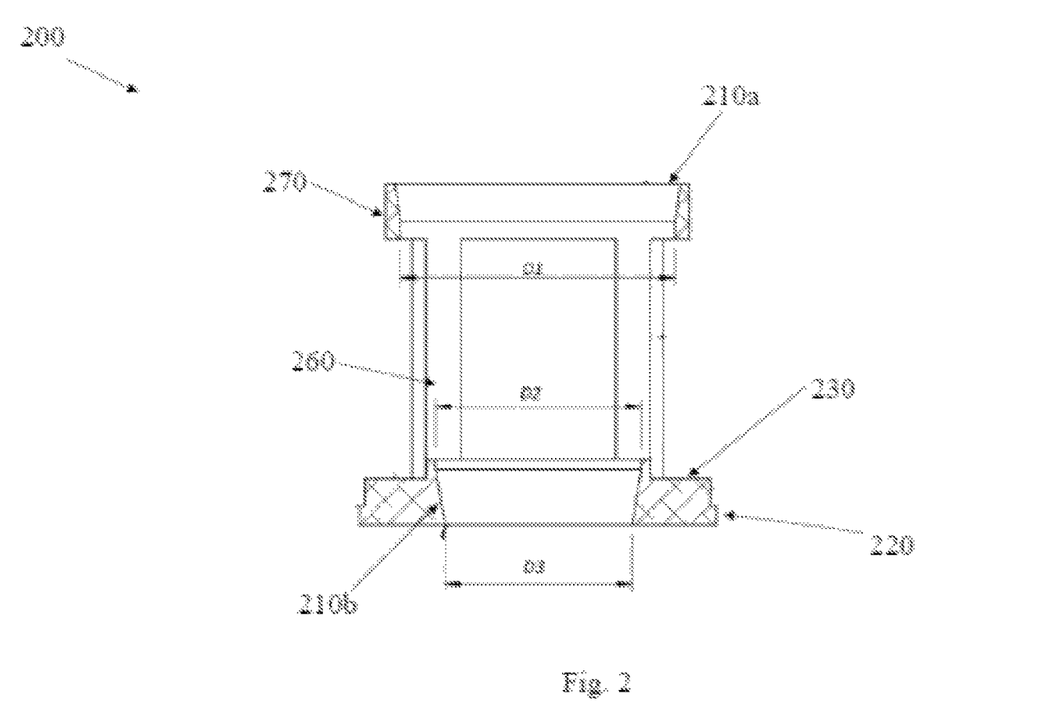
FIG. 2 shows construction of the outlet housing in accordance with an embodiment of the present invention.
Figure 2A:
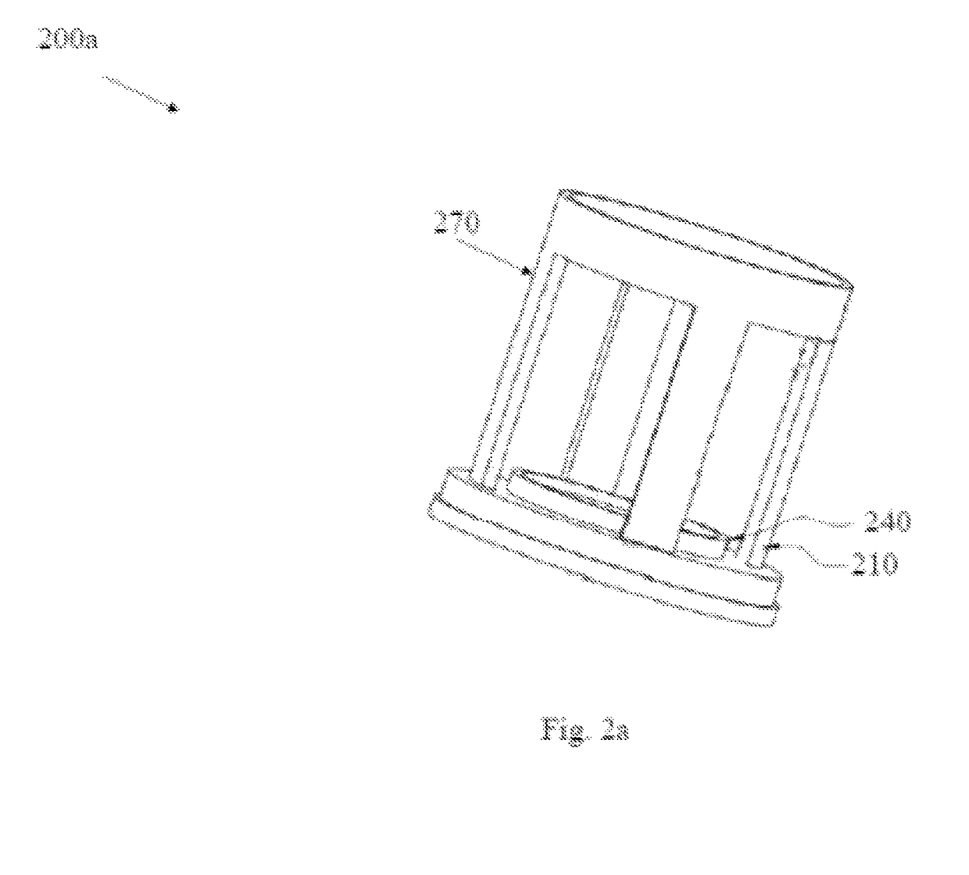
FIG. 2a shows perspective view of the outlet housing of the air blaster in accordance with an embodiment of the present invention.

FIGS. 2 & 2a shows cross sectional view (200) and perspective view (200a) of an outlet housing (210) of the air blaster (100) in accordance with an embodiment of the present invention. The outlet housing (210) comprises a hollow cylindrical body having an opening at the top (210a) and an opening at the bottom (210b), with an integral outer flange (220) and an inner lip (230) with a raised sealing lip (240). The inner wall of the outlet housing (210) may be coated with a lubricating agent (either solid, semi-solid or liquid), or a bush bearing (390b) to reduce sliding friction with outlet piston 250. Equally spaced openings or holes (260) of suitable size are provided on the cylinder wall (270) which allows the air through the cylinder wall and makes contact with the outlet piston face (250a). The opening at the top of the cylindrical body (210a) is tapered to allow the piston assembly to enter the cylinder easily. The inner diameter (D2) at sealing lip of the outlet housing is less compared to inner diameter (D1) on the cylinder entry side. Inner diameter at sealing lip (D2) gradually reduces to a further smaller diameter (D3) through a taper at the discharge opening or outlet (210b).

In a preferred embodiment, the taper is of about 10 Degrees.

Figure 2B:
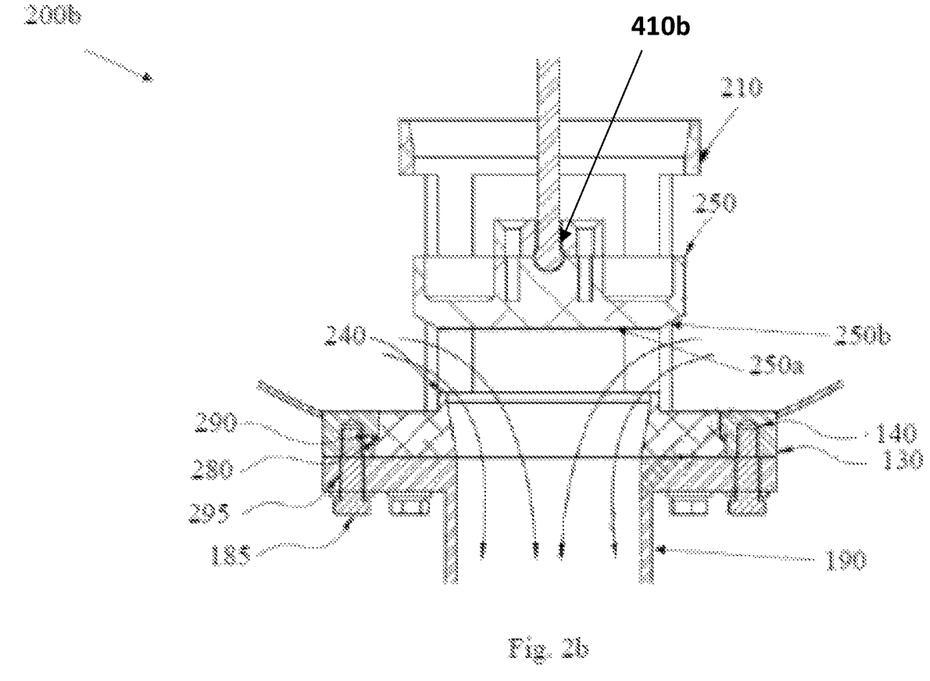
FIG. 2b shows a cross-sectional detail of the outlet side during discharge stage in accordance with an embodiment of the present invention.

As shown in FIG. 2b, the outlet housing (210) is inserted into the tank through the outlet flange (130). The outer flange (220) on the outlet housing rests on a concentric counter bore (280) provided on the outlet flange (130). A seal (290) of suitable material preferably rubber is provided between the mating surfaces to prevent leakage of air. One end of a dual flanged coupling (190) is mated with the outlet flange (130). The flanges of the coupling have equidistant holes (295) in conformity with the threaded holes (140) on the outlet flange. The coupling (190) is fastened to the tank with suitable fasteners 185 inserted into the threaded holes provided on the outlet flange (130).

Figure 3:
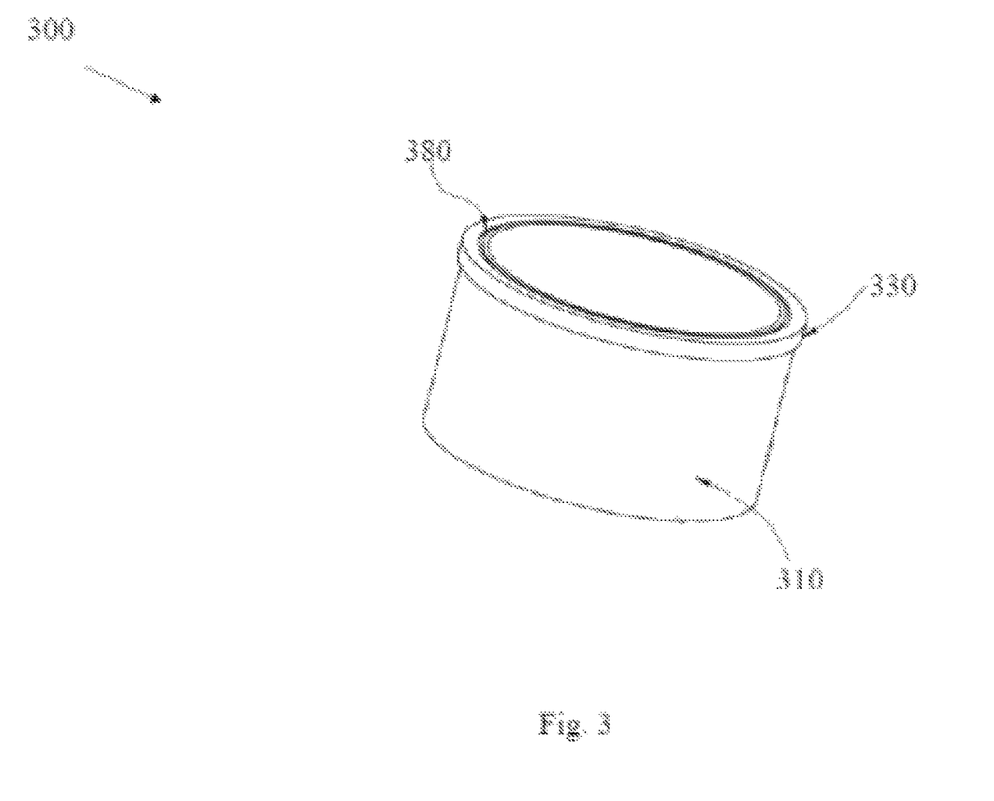
FIG. 3 shows construction of the inlet housing in accordance with an embodiment of the present invention.

FIG. 3 shows perspective view (300) of an inlet cylindrical housing (310), which is also a single body structure like outlet housing (210). It is inserted through the inlet flange (120) at inlet side of the tank (110). The inner wall of the housing (310) may be coated with a lubricating agent (either solid, semi-solid or liquid), or a bush bearing to reduce sliding friction with inlet piston (320). Similar to the outlet housing, the inlet housing also has an integral flange (330) which rests on a concentric counter bore (340) provided on the inlet flange (120). A seal (350) of suitable material preferably made of rubber seal is provided between the mating surfaces of flanges to prevent leakage of air.

Figure 3A:
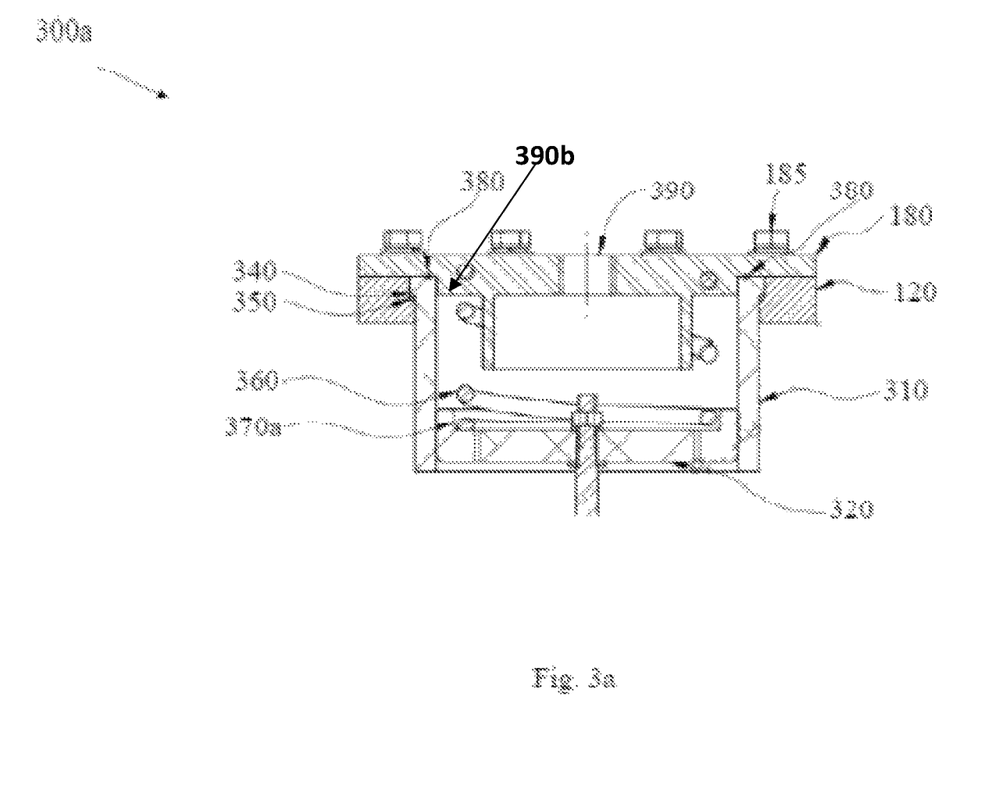
FIG. 3a shows the detailed cross section of air blaster inlet during filling stage in accordance with an embodiment of the present invention.

Referring to FIG. 3a a cross sectional view (300a) of air blaster inlet is provided in accordance with an embodiment of the present invention. The inlet housing (310) includes a dampening device (360) such as spring which is placed into the cavity (370a) of the inlet piston. One end of the spring slightly rises out of the tank. A top cover (180) is placed over the dampening spring and pressed to mate with the surface of the inlet flange (120). A seal (380) made of a suitable material preferably rubber is provided between the mating surfaces to prevent the air from escaping. The top cover (180) is secured with the inlet flange (120) using fasteners (185) through the threaded holes (140). It may be contemplated that other fixing mechanisms such as hot or cold welding may also be used to secure the Intel flange (120). A guide (195) is provided in the top cover to hold the spring in correct position. The top cover is provided with equidistant holes (145), in conformity with the threaded holes (140) on the inlet flange (120).

In an exemplary embodiment a quick exhaust valve of standard design is fitted to the top cover by means of a coupling. The coupling is mated to a threaded hole (390) at the centre of the top cover. Compressed air line is connected to the quick exhaust valve.

Figure 4:
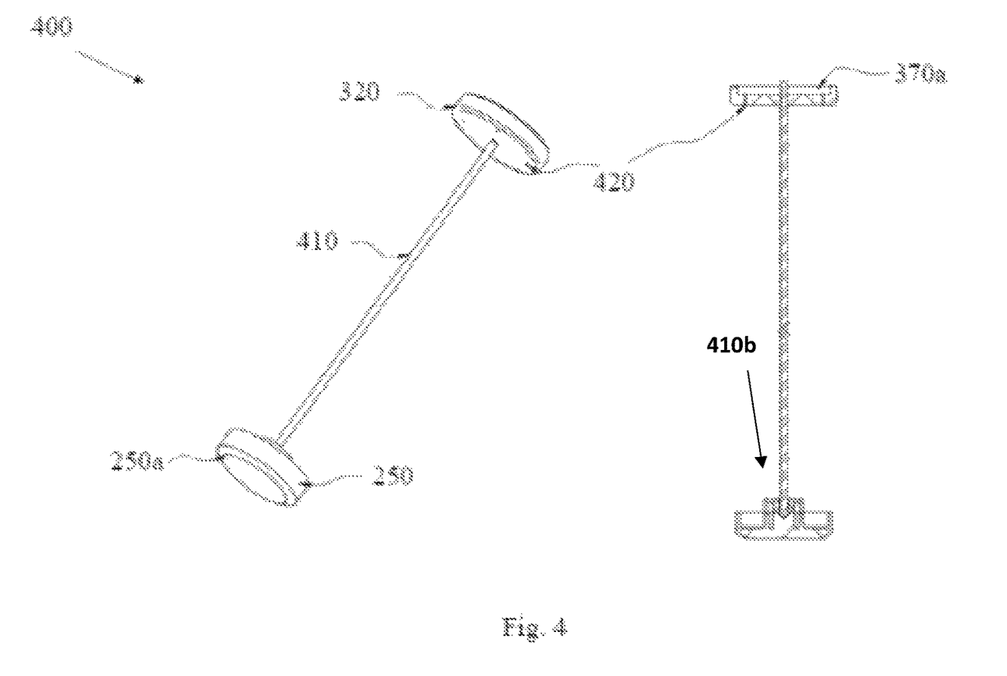
FIG. 4 shows construction of a Piston assembly in accordance with an embodiment of the present invention.

FIG. 4 shows piston assembly (400) according to an embodiment of the present invention. The piston assembly comprises of an outlet piston (250) and inlet piston (320) connected together with a coupling mechanism (410). The coupling mechanism (410) consists of a rigid connecting rod which enables the tandem movement of both pistons and end connections which connects the rod to the pistons. It may be contemplated that other similar arrangements may be incorporated to ensure the movement of inlet and outlet pistons in tandem. The rod may be made from suitable material preferably a metal or hard plastic and formed in any shape and size according to requirement. The Inlet Piston (320) is coupled directly with the connecting rod rigidly, preferably a using screw connection. The inlet piston (320) has multiple air holes (420) of suitable diameter to allow air to pass through it, into the rigid container during the filling phase. The piston assembly is inserted into the rigid container through the inlet cylindrical housing (310) with the outlet piston (250) passing through first. The outlet piston (250) is coupled with the rod using a ball and socket (410b) arrangement made of suitable material, which enables free movement of the piston with reference to the connecting rod. The piston assembly (400) is inserted into the tank (110) through the inlet housing (310) until the outlet piston (250) rests on the raised sealing lip (240) of outlet housing (210). The inlet piston (320) will be positioned inside the inlet housing (310).

In an embodiment, the free end of the dual flange coupling (190) at the outlet side of the air blaster (100), is attached to an air discharge tube, which is normally a metallic tube having a flange welded at one end and the other end welded to the wall of the vessel in which the bulk material is stored. A nozzle of suitable design is fitted to the discharge tube, at the end which is within the vessel/tank/silo, in order to direct the discharge air correctly into built up bulk material.

Figure 5:
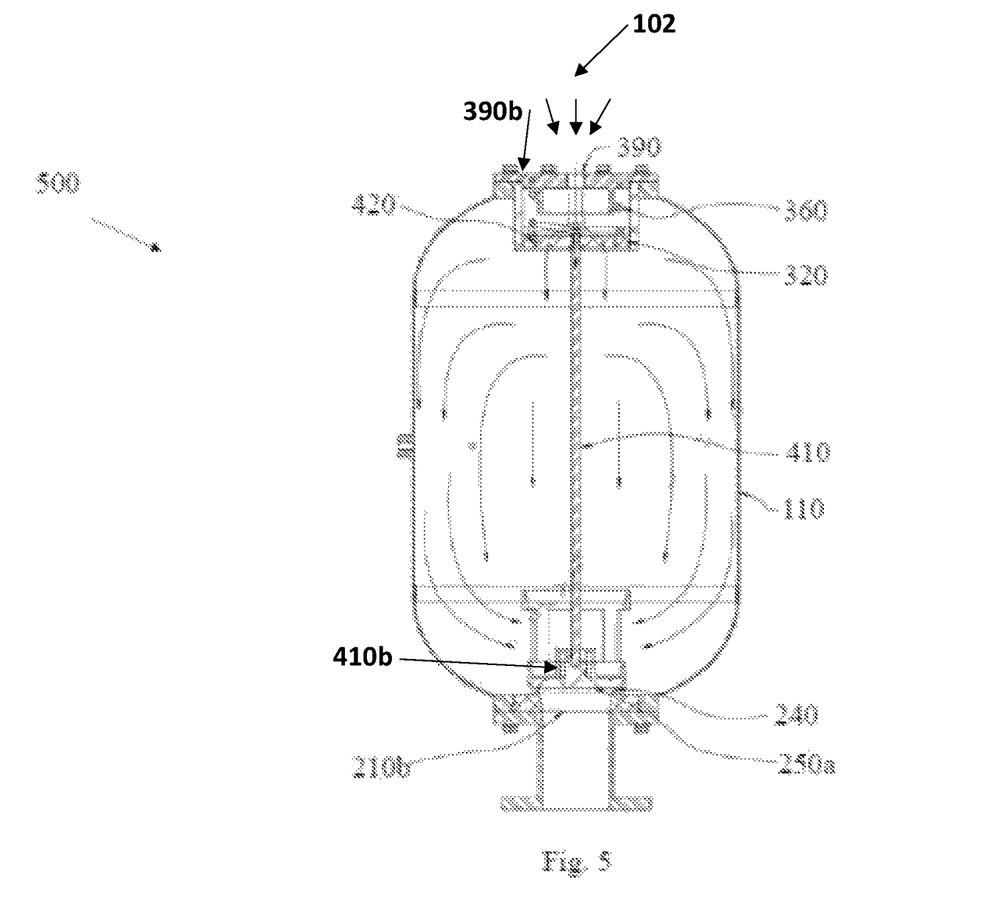
FIG. 5 shows a cross section view of air blaster during filling stage in accordance with an embodiment of the present invention.

FIG. 5 shows the configuration (500) of air blaster during the filling stage in accordance with an embodiment of the present invention. Compressed air comes through a hole (390) from the quick exhaust valve connected to it, passes through the air holes (420) provided on the inlet piston (320) and is filled into the tank (110). The inlet air pressure and the pressure from the dampening device/spring (360) pushes the piston assembly so as to have the outlet piston face (250a) sealing itself onto the raised sealing lip (240) thereby filling the tank (110). This is referred to as the filling position. The filling continues till the incoming air pressure is equal to the pressure within the tank or rigid container (110). During this entire process of filling, the outlet piston face (250a) of the outlet piston (250) is pressed against the sealing lip (240), thus preventing the air inside the tank or rigid container (110) from leaking to the outsides through the opening at bottom (210b). A sealing mechanism may be employed between the outlet piston and the sealing lip, if required, to improve the sealing. Once pressure of the inlet compressed air and the filled compressed air is equal, the blaster is ready to operate at its optimum level. Both pistons remain in the filling position at this stage.

Figure 6:
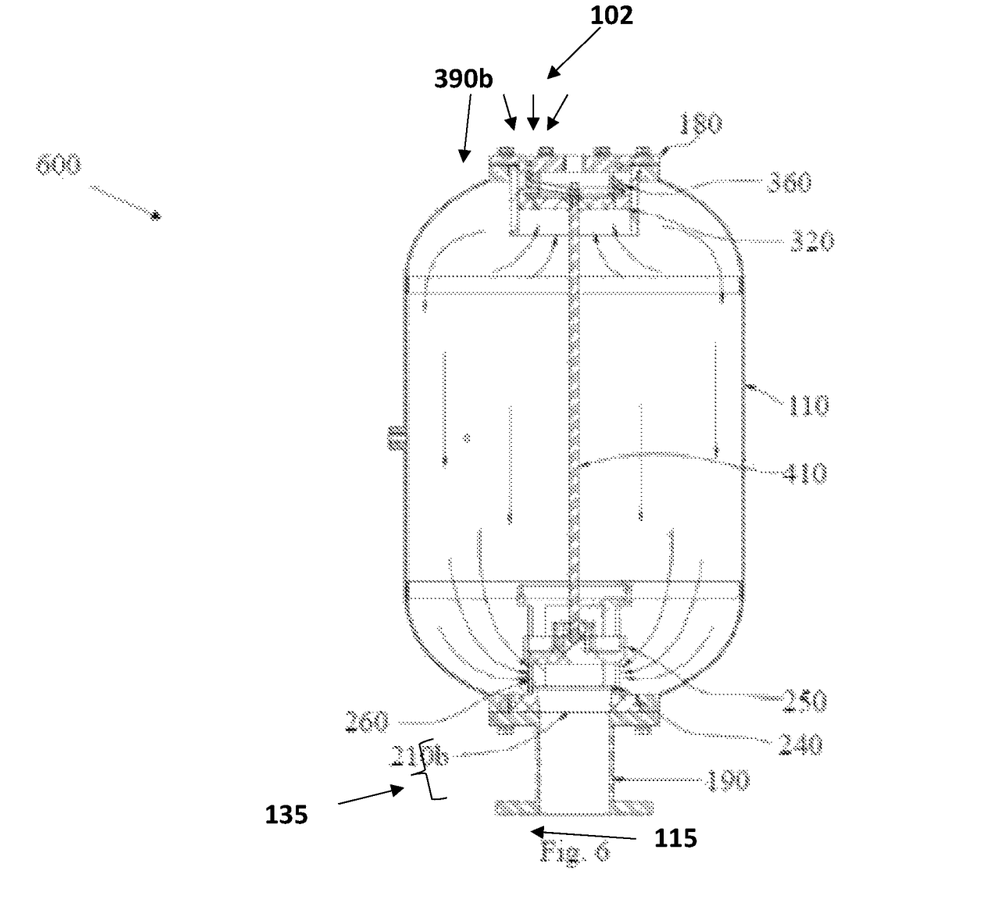
FIG. 6 shows a cross section view of air blaster during discharge stage in accordance with an embodiment of the present invention.

Referring to FIG. 6, configuration (600) of an air blaster during the discharge stage is shown in accordance with an embodiment of the present invention. The input compressed air supply (102) is cut off by means of a manually operated 3-way valve or a 3-way solenoid valve. In the event of a solenoid valve ideally an instrumentation panel is used to operate the solenoid valve. Sequential timer or a PLC can be used to automate the firing sequence when multiple blasters are fitted on a single bulk material vessel. When the input compressed air supply (102) is cut off, the inlet pressure drops which results in a differential pressure inside the tank (110). As a result, the pressure in the filled container (110) becomes higher than the inlet pressure.

In an embodiment, the higher pressure within the tank (110) or rigid container acts on the surface of the inlet piston (320). Simultaneously, the filled compressed air passes through the holes (260) provided on the outlet housing (210), puts pressure on the chamfered edge (250b) of the outlet piston (250). Pressure acting on the outlet and inlet pistons, as they have been connected together by the coupling mechanism (410), pushes the entire piston assembly towards the top cover, compressing the dampening device/spring. This movement of the entire piston assembly opens up a gap between the outlet piston (250) and the sealing lip (240), creating the passage to the compressed air to discharge instantly through the hole (260), through the opening (210b), and the outlet flange (130), and finally through the dual flanged coupling (190). This is referred to as the exhaust position.

In an embodiment, the discharged air then travels through the discharge pipe, through the nozzle and onto the bulk material within the vessel/tank/silo.

In an embodiment, the force produced by the sudden release and expansion of compressed air creates a strong blast of air in the stored vessel/tank/silo, shaking the build-up material and thus creating the agglomerated particles to break free from each other, and bulk flow is resumed. Once the blast of air is complete, there is huge drop in pressure within the tank/rigid container. The pressure of the inlet compressed air would now be greater than the pressure within the tank/rigid container and assisted additionally by the compressed dampening spring, pushes the inlet piston and thereby the piston assembly away from the top cover, putting the system back to the filling position.

In an embodiment, the inlet piston (320) has a predetermined number of air holes (420) which allows the input compressed air to enter the tank (110). These holes are of appropriate dimensions to enable faster filling of the tank between blasts. The discharge happens when the inlet air supply (102) is cut off, and the compressed air within the tank (110) pushes the inlet piston (320) back, opening up a gap between the outlet piston (250) and the raised sealing lip. In the products currently operating, if the air inlet holes were bigger, there is a chance of air leaking back through the holes into the inlet cylindrical housing (310) and the force of the blast might be compromised or a good possibility that the blast might not even happen. The present invention addresses this issue by providing a dual piston assembly (400). Since pressure acts simultaneously on both the inlet and outlet pistons, and since both pistons are connected to move in tandem, bigger holes (420) are provided on the inlet piston (320) enabling faster refilling, thereby increasing the blast frequency.

In an exemplary embodiment, a venturi effect on the discharged air is created by gradually reducing the diameter inside the outlet housing (210). In the area holding the outlet piston (250) the bore diameter D1 is kept maximum while, it is reduced to D2 in the area where the raised sealing lip (240) is provided. The air from the tank (110) discharges through the opening (210b). The inner diameter of outer flange (220) starts at D2 and further reduces to D3 in the area where the air travels out of the outlet housing into the discharge nozzle (115). This gradual reduction of diameter acts like a venturi and as a result the velocity of air increases and air gains kinetic energy which further enhances the blast force.

In an embodiment the present invention provides a method for triggering high speed blast in air blaster. The method includes the step of filling a tank of the air blaster with compressed air wherein the compressed air passes through an inlet hole (390) from a quick exhaust valve connected to it and then passes through the air holes (420) provided on an inlet piston (320) before it is filled into the tank. The method further includes the step of continuously pressing an outlet piston face (250a) of an outlet piston (250) against a sealing lip (240) thereby preventing the air inside the tank from leaking outside wherein the tank fills until incoming compressed air pressure is equal to the pressure within the tank (110). The method includes achieving an optimum level for operating the blaster (100) once pressure of the inlet compressed air and the filled compressed air is equal, cutting off compressed air supply (102) to reduce an inlet pressure of the compressed air thereby resulting in a differential pressure inside the tank (110) as a pressure inside the tank (110) becomes higher than the inlet pressure, and triggering a blast with minimum energy loss and high impact force through movement of a dual piston assembly wherein the piston assembly (400) includes the inlet piston (320) connected to the outlet piston (250) with a coupling mechanism 410 such that the inlet piston (320) and the outlet piston (250) move in tandem and pressure acting on the inlet piston (320) and outlet piston (250) pushes the assembly towards top of the tank (110) thereby compressing a dampening device (360), wherein movement of dual piston assembly (400) opens a gap for instant discharge of compressed air through a contracting discharge mechanism (135) and a force produced by the instant discharge of air creates a strong blast of air in the tank (110).

In a related embodiment the method of the present invention includes the step of allowing discharge air to pass through an arrangement with gradual reduction of diameter of a passage through which the discharge air passes thereby acting like a venturi and as a result velocity of air increases and air gains kinetic energy which further enhances the blast force.

In an embodiment a configuration of the passage is part of the contracting discharge mechanism (135).

The advantages of the present invention are faster filling, faster discharge and greater blast force. The particular examples and scenarios used in this document are for ease of understanding and are not to be limiting. Additional features may also be contemplated that may be useful in air blasters.

Moreover, features described herein may be used in many other contexts, as would be understood by one of ordinary skill in the relevant art.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. An air blaster comprising:
a tank filled with compressed air wherein an inlet pressure of the compressed air drops when the compressed air supply is cut off thereby resulting in a differential pressure inside the tank as a pressure inside the tank becomes higher than the inlet pressure; and a dual piston assembly (400) inside the tank (110) for triggering a blast with minimum energy loss and high impact force, wherein the piston assembly (400) includes an inlet piston (320) connected to an outlet piston (250) with a coupling mechanism (410) such that the inlet piston (320) and the outlet piston (250) move in tandem and pressure acting on the inlet and outlet piston (250) pushes the assembly towards top of the tank (110) thereby compressing a dampening device (360);

wherein movement of dual piston assembly (400) opens a gap for instant discharge of compressed air through a contracting discharge mechanism and a force produced by the instant discharge of air creates a strong blast of air from the tank (110).

2. The air blaster as claimed in claim 1 further comprising a discharge pipe configured for receiving the air within the tank (110) and transferring onto bulk material through a discharge nozzle.

3. The air blaster as claimed in claim 2 wherein the strong blast of air shakes the material to enable agglomerated particles to break free from each other for resuming bulk flow.

4. The air blaster as claimed in claim 2 wherein the gap is between the outlet piston (250) and a sealing lip (240) that creates a passage for compressed air to discharge instantly through at least one hole of an outlet housing (210) then through an opening (210b), an outlet flange (130) and finally through a dual flanged coupling (190) to get the blaster (100) in exhaust position.

5. The air blaster as claimed in claim 4 wherein the contracting discharge mechanism creates a venturi effect on the discharged air by gradual reduction of diameter inside the opening (210b).

6. The air blaster as claimed in claim 5 wherein the contracting discharge mechanism includes an area holding the outlet piston (250) with a bore diameter kept maximum while, diameter is reduced in an area where air from the tank (110) enters the opening 210(b) and diameter is further reduced in an area where the air travels out of the opening (210b) into a discharge nozzle wherein gradual reduction of diameter occurs and as a result velocity of air increases and air gains kinetic energy which further enhances the blast force.

7. The air blaster as claimed in claim 1 wherein the coupling mechanism (400) consists of a rigid connecting rod which enables the tandem movement of both pistons and end connections which connects the rod to the pistons (250, 320).

8. The air blaster as claimed in claim 7 wherein the inlet piston (320) is coupled directly with the rigid connecting rod, preferably by screw connection wherein the inlet piston (320) has multiple air holes (420) of suitable diameter to allow air to pass through it, into the tank (110) during a filling phase.

9. The air blaster as claimed in claim 8 wherein the piston assembly is inserted into the tank (110) through the inlet cylindrical housing (310) with the outlet piston (250) passing through first.

10. The air blaster as claimed in claim 9 wherein the outlet piston (250) is coupled with the rod using a ball and socket.

11. The blaster as claimed in claim 1 wherein the piston assembly is inserted into the tank (110) through an inlet housing (310) until the outlet piston (250) rests on a raised sealing lip (240) of an outlet housing (210) wherein the inlet piston (320) is positioned inside the inlet housing (310).

12. The blaster as claimed in claim 4 wherein the outlet housing (210) comprises a hollow cylindrical body having an opening at top (210a) and an opening at bottom (210b), with an integral outer flange (220) and an inner lip (230) with the raised sealing lip (240).

13. The blaster as claimed in claim 12 wherein an inner wall of the outlet housing (210) is coated with a lubricating agent (either solid, semi-solid or liquid), or a bush bearing to reduce sliding friction with the outlet piston (250).

14. The blaster as claimed in claim 13 wherein equally spaced openings or holes (260) of suitable size are provided on the cylinder wall (270) which allows the air through the cylinder wall (270) to make contact with the outlet piston face (250a).

* * * * *